UNITED STATES PATENT OFFICE.

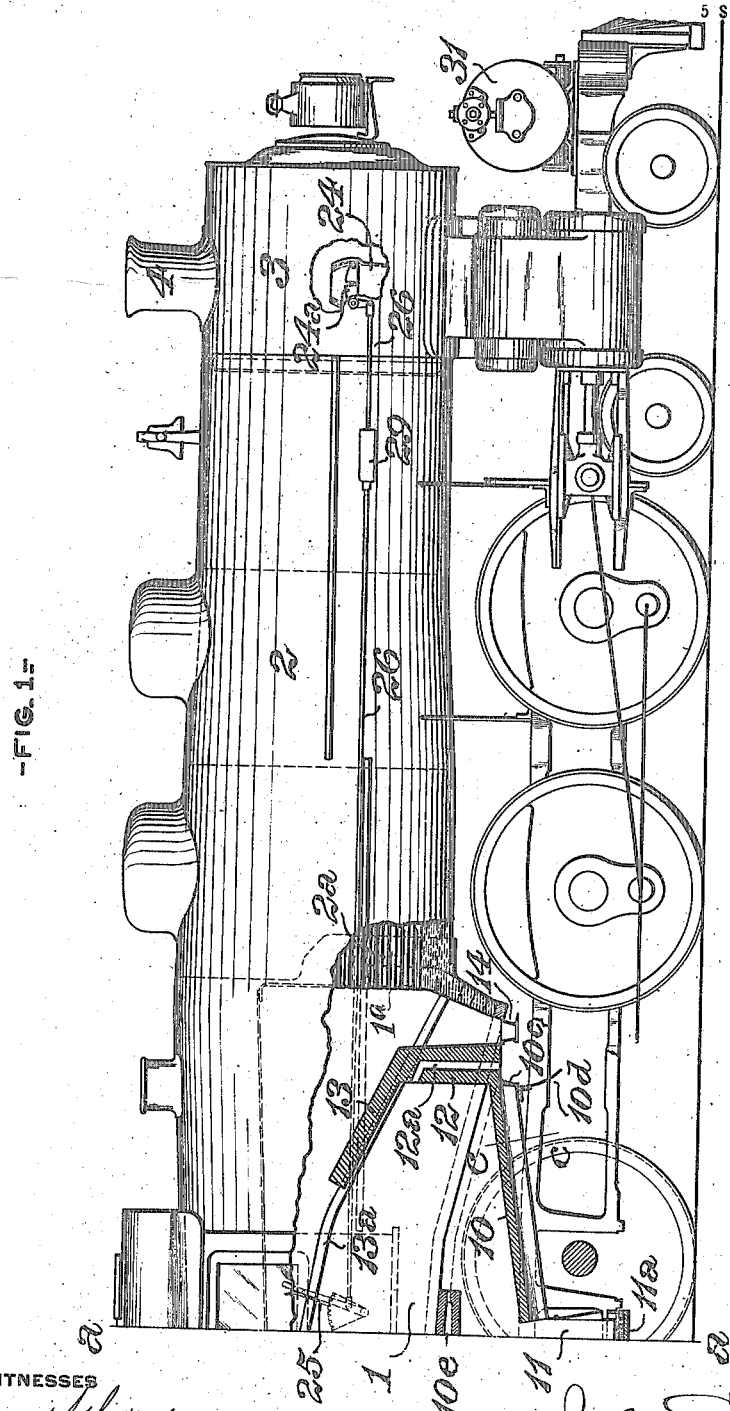

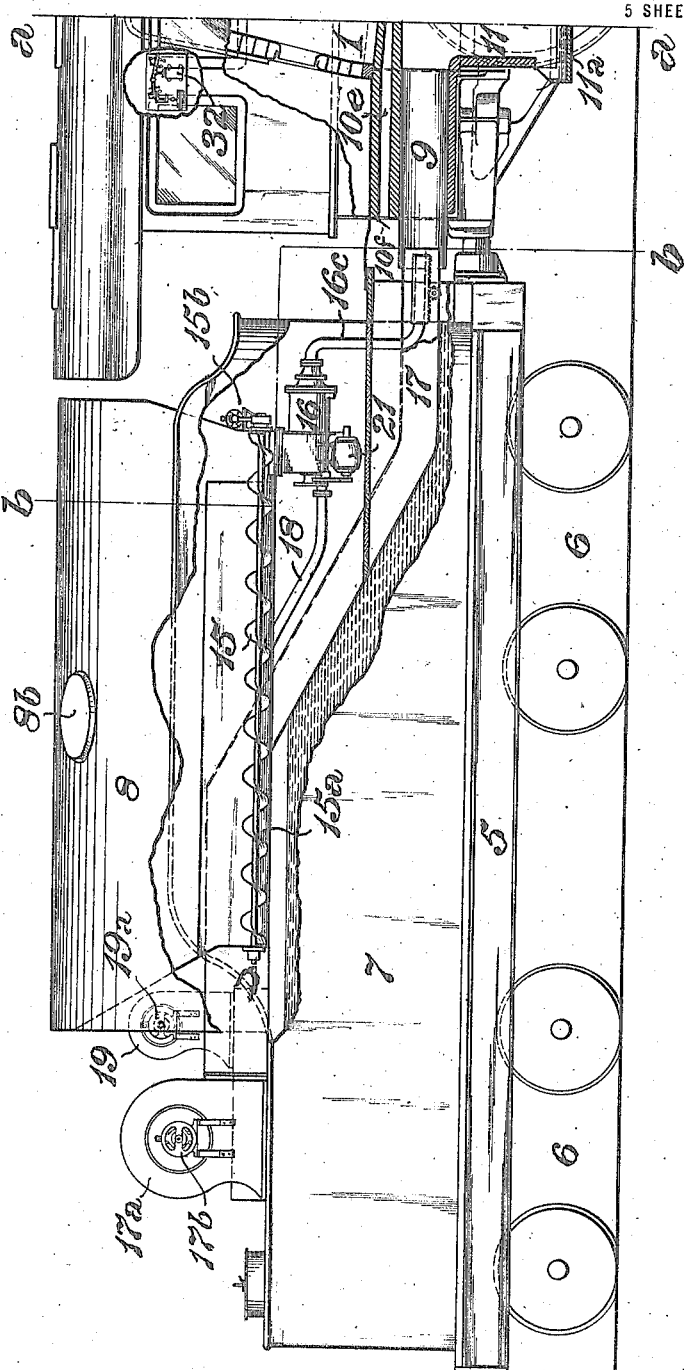

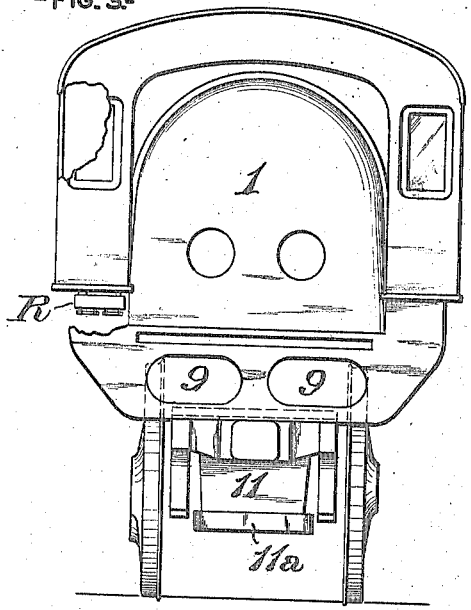
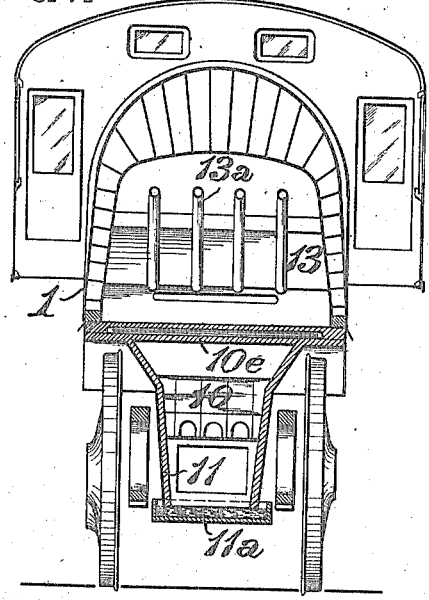
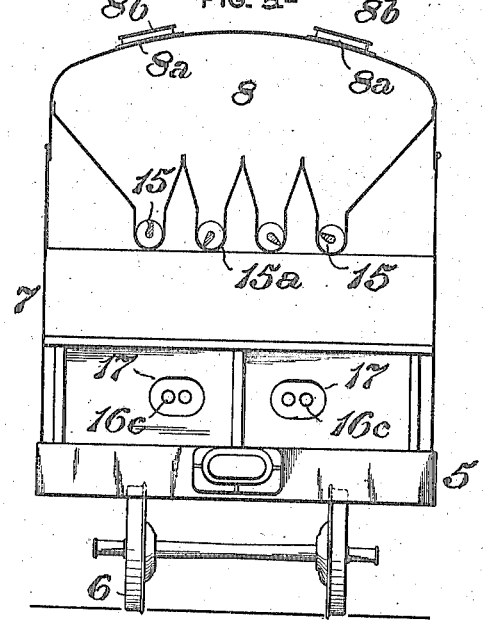
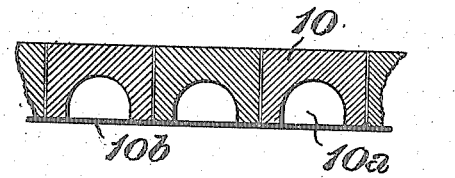
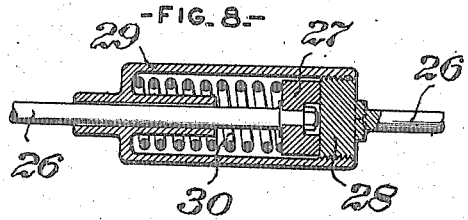
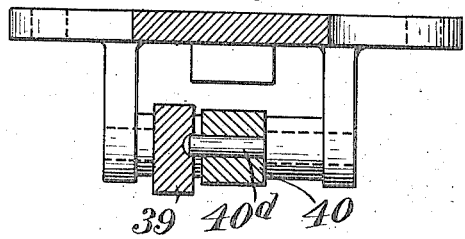

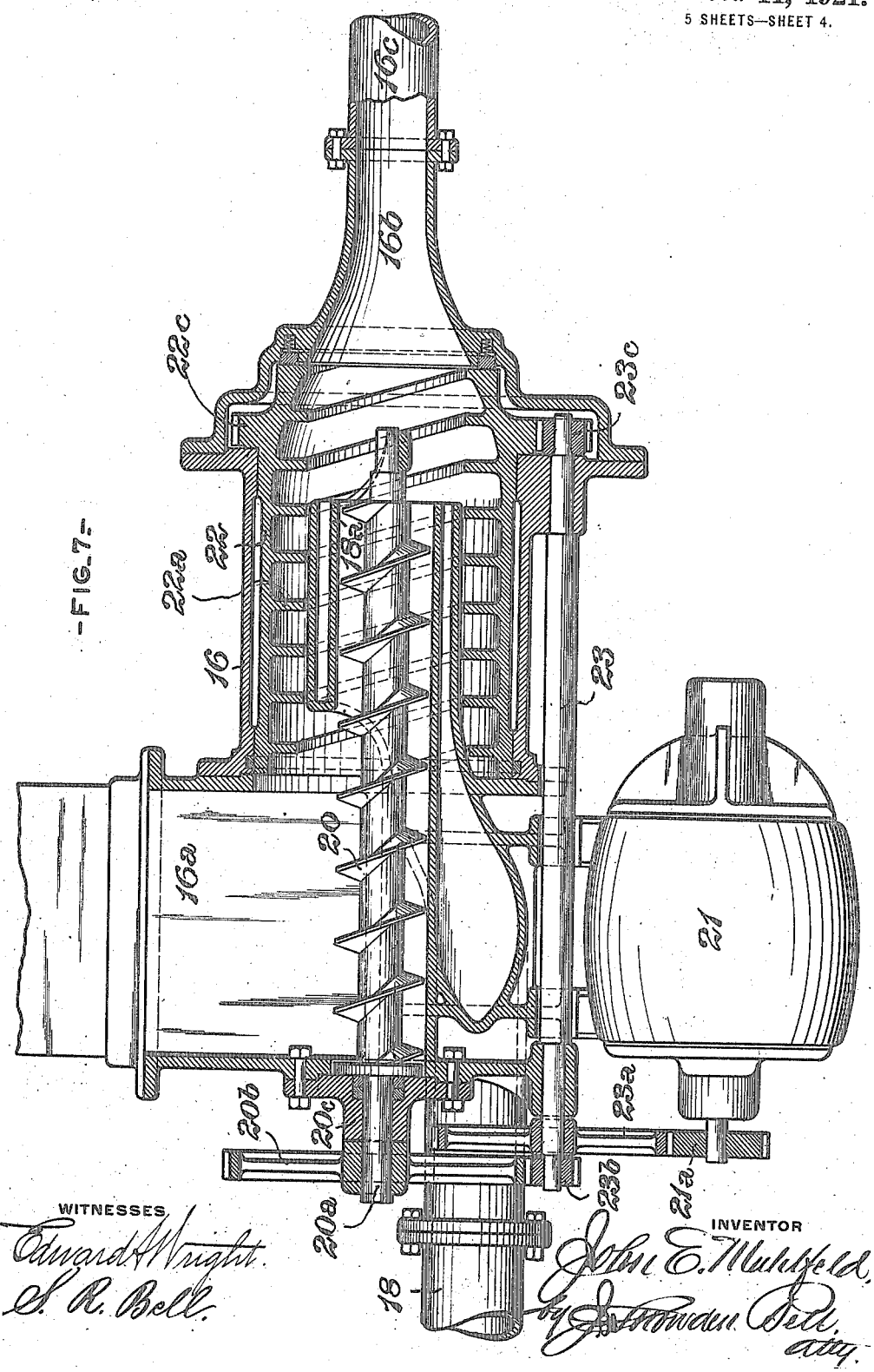

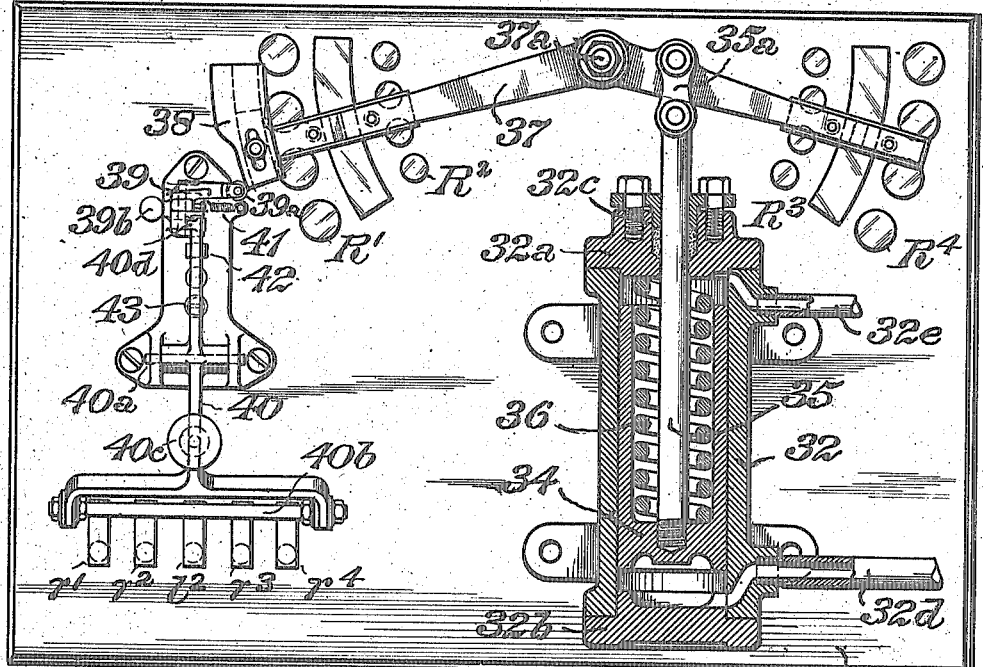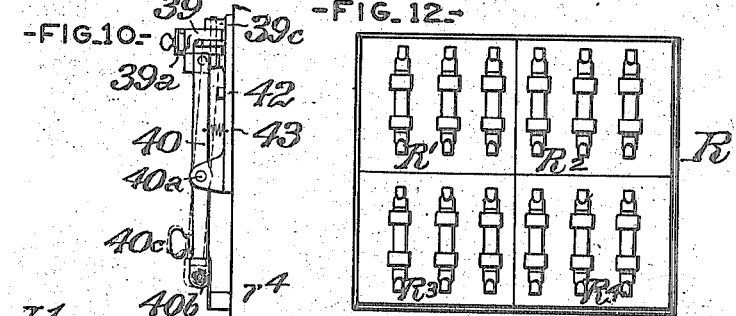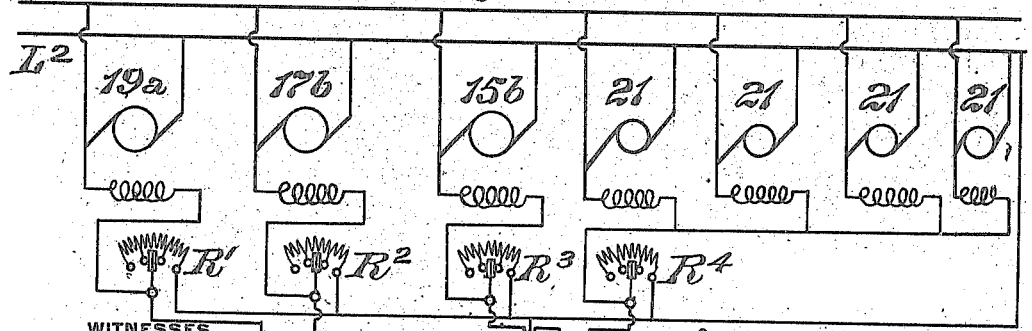

JOHN E. MUHLFELD, OF SCARSDALE, NEW YORK, ASSIGNOR, BY MESNE ASSIGNMENTS, TO LOCOMOTIVE PULVERIZED FUEL COMPANY, A CORPORATION OF DELAWARE.

PULVERIZED-FUEL-BURNING LOCOMOTIVE.

1,393,240. Specification of Letters Patent. Patented Oct. 11, 1921.

Application filed June 5, 1914. Serial No. 843,223. Renewed October 23, 1920. Serial No. 419,071.

*To all whom it may concern:*

Be it known that I, JOHN E. MUHLFELD, of Scarsdale, in the county of Westchester and State of New York, have invented a certain new and useful Improvement in Pulverized-Fuel-Burning Locomotives, of which improvement the following is a specification.

The object of my invention is to enable the utilization of pulverized combustible matter as fuel for the generation of steam in locomotive boilers, to be effectively and economically practised, by the provision of suitable and readily applicable means for storing, distributing, conveying, commingling with air, preheating, and consuming this class of fuel in a locomotive boiler of the present standard type, in such manner that the gases of combustion may be conveyed, and applied with comparative slowness, to the flues, tubes, firebox and combustion chamber sheets, and other heat absorbing surfaces of the boiler; the draft be regulated and controlled in accordance with the varying conditions of service; and the residual matter be separated and discharged with the minimum degree of reduction of the evaporative efficiency of the boiler.

The improvement claimed is hereinafter fully set forth.

In the accompanying drawings: Figures 1 and 2, considered together and joined in their numerical order, constitute a diagrammatic side view, partly in section, of a locomotive and tender, illustrating an embodiment of my invention; Fig. 3, a rear view, in elevation, of the locomotive; Fig. 4, a vertical transverse section, on the line *a a* of Figs. 1 and 2; Fig. 5, a front view of the tender, partly in elevation and partly in section on the line *b b* of Fig. 2; Fig. 6, a partial transverse section, on an enlarged scale, through the floor of the firebox, on the line *c c* of Fig. 1; Fig. 7, a vertical longitudinal section, on an enlarged scale, through one of the fuel and air feeding mechanisms; Fig. 8, a longitudinal central section through the variable exhaust regulating mechanism; Fig. 9, a view, partly in elevation and partly in section, of the automatic and manually operative motor speed regulating mechanisms; Fig. 10, a side view, in elevation, of the switch lever of the manually operative regulating mechanism; Fig. 11, a detail view of the trip device; Fig. 12, a view, in elevation, of a resistance box; and Fig. 13, a wiring diagram of the regulating resistance.

The hauling capacity of steam locomotives of all of the various types now generally operated in railroad service is limited by the steam generating capacity of their boilers, which, in turn, is subject to the limiting conditions of the combustion that can be effected in them, as well as by cylinder back pressure. Steam is generated from solid carbonaceous or liquid hydrocarbon fuels, and the air required for combustion is drawn into and through the firebox and tubes, by draft inducing means located in the smoke box of the boiler. This method of supplying the air essential to proper combustion, particularly in cases where a large proportion of it must be carried through comparatively thick layers of fuel, ash, and clinkers on the grates, causes a very rapid movement of the gaseous products of combustion through the firebox and tubes, and results in the retention of a relatively high temperature in the gases when expelled from the smoke box into the atmosphere, with a consequent corresponding loss of steam generating efficiency by reason of the waste of the heat carried out by them from the boiler.

A further reduction of efficiency results from the fact that in the use of solid carbonaceous fuel, the comparatively large pieces thereof which are supplied to the firebox are not fully disintegrated, so that the particles of which they are composed shall be fully exposed to the action of the air requisite to effect their combustion; suitable and effective means for preheating and commingling the volatile carbon and oxygen prior to combustion and thereby promoting complete combustion before the gases come in contact with the heat absorbing and convecting surfaces of the boiler are not provided; and finally, quite a large percentage of the particles of fuel is, by the force of the exhaust blast, mechanically separated and carried out of the tubes unconsumed.

The efficiency losses due to these and other conditions now existing, are familiar to those conducting the operation of railroad motive power, and my invention is designed to substantially reduce them in practice with locomotives of the present standard types, by enabling the calorific effect of low grade and inexpensive fuel to be thoroughly and effectively utilized, under the application of means which do not involve any material or expensive modifications of the ordinary locomotive boiler proper, and are of ready applicability thereto.

Referring to the drawings, my invention is herein exemplified as applied in connection with a locomotive engine and tender, which, except as to the features of novelty of my invention hereinafter described are of ordinary approved construction, the locomotive being of the ten wheel or 4—6—0 type, and the tender having a water bottom tank supported on two trucks of four wheels each. The boiler of the locomotive is provided with a firebox, 1, of the usual form, from which a plurality of tubes, $2^a$, extend through the shell or waist, 2, to the smoke box, 3, from which the stack, 4, leads to the atmosphere. The tender comprises a frame, 5, supported on the pairs of truck wheels, 6; a water bottom tank, 7, secured to the frame, and a fuel storage receptacle, 8, fitted detachably in and above the space between the sides of the water tank.

In the practice of my invention, I provide one or more preliminary combustion or expansion chambers, 9, each of which is open at its front end to the firebox, 1, and extends rearwardly therefrom, and substitute, for the ordinary grate and ash pan, a floor, 10, of firebrick or other suitable refractory material which extends on an upward incline, from the top of a downwardly depending slag pan 11, at the rear of the firebox, to a vertical bridge wall, 12, extending across the firebox, a short distance in rear of the flue sheet, $1^a$, thereof, and having formed within it an air channel or channels, $12^a$. A baffle, 13, of refractory material, extends upwardly and rearwardly from the top of the bridge wall, 12, and, in this instance, is shown as supported on correspondingly inclined water circulating tubes, $13^a$. An ash hopper, 14, closes the bottom of the firebox space forward of the bridge wall, and admits of the withdrawal of any residuum that may pass over the baffle and be deposited in front of the bridge wall. The slag pan, 11, is open at bottom and extends into a lower water pan, $11^a$, which is filled with water above the level of the bottom of the slag pan, so as to institute a water seal therefor. The floor, 10, of the firebox is composed of blocks of refractory material, in each of which there is formed a longitudinal air channel, $10^a$, said blocks resting on a substantial plate of metal, $10^b$, which is supported at its sides by suitable connections to the mud ring of the firebox. The air channels, $10^a$, are open, at their rear ends, to the slag pan, 11, near its top, and are therefore in communication with the preliminary combustion chamber; and are open, at their front ends, to the atmosphere, communication with which is controlled by a damper, $10^c$. A curved deflecting plate, $10^d$, is secured to the front end of the floor supporting plate, $10^b$, and serves to direct currents of air, due to the movement of the locomotive, into the air channels, $10^a$, when the damper, $10^c$, is open, as well as into one or more air induction conduits, $12^a$, formed in the bridge wall. An induced air conduit, $10^e$, extends over the top of the preliminary expansion chamber, 9, said conduit being open to the firebox, at its front end, and its rear end being controlled by a damper, $10^f$. It will be seen that air which passes through the floor channels, $10^a$, and air conduits, $12^a$ and $10^e$, is preliminarily heated therein by the combustion of the fuel in the firebox, before being admitted thereto.

The fuel storage receptacle, 8, of the tender, is supplied with pulverized fuel through fuel inlets, $8^a$, in its top, closed by suitable tight covers, $8^b$, and the fuel is carried therefrom, by a plurality of screw conveyers, 15, each of which is rotated in a channel, $15^a$, in the bottom of the storage receptacle, by a motor, $15^b$, suitably connected to the several conveyers, to a corresponding number of fuel and air feeding mechanisms, located adjacent to the front end of the fuel storage receptacle, which mechanisms are, in this instance, of the following construction. A horizontal casing, 16, of substantially cylindrical form, is provided, at its top, with a receiving channel, $16^a$, communicating with the forward end of one of the conveyer channels, $15^a$, and, at its forward end, with an inwardly tapering discharge channel, $16^b$, from which a pipe, $16^c$, leads into a volume air conduit, 17, of larger diameter, the forward end of which opens into the preliminary combustion chamber, 9, and to which air is supplied by a blower, $17^a$, operated by a motor, $17^b$. A high pressure air blast pipe, 18, leads from a blower, 19, operated by a motor, $19^a$, into one side of the casing, 16, within which it communicates with an annular discharge nozzle, $18^a$, concentric therewith and open at its forward end. A screw conveyer, 20, is fixed on a shaft, $20^a$, which is rotated in bearings, $20^c$, in, and concentric with, the casing, by a motor, 21, located below it. The conveyer, 20, extends from the vertical plane of the receiving channel, $16^a$, to the forward end of the annular nozzle, $18^a$, and fits truly in said nozzle. A return screw conveyer, 22, is fitted to rotate in bearings in the casing, 16, said conveyer having an annular body, the end portions of which are finished to fit the casing bearings, and an internal screw thread, $22^a$, of reverse lead to the screw of the conveyer, 20, the screw thread, $22^a$, fitting truly around the annular nozzle, $18^a$. A spur pinion, $21^a$, on the shaft of the motor, 21, engages a corresponding gear, 23ª, on a shaft, 23, journaled longitudinally in bearings on the casing, and a spur pinion, 23ᵇ, on the shaft, 23, engages a corresponding gear, 20ᵇ, on the shaft, 20ª, of the conveyer, 20. The auxiliary screw conveyer, 22, is rotated by a spur pinion, 23ᶜ, on the shaft, 23, which engages a corresponding gear, 22ᶜ, on the conveyer, 22.

It will be seen that in the operation of this mechanism, pulverized fuel which is supplied from one of the conveyer channels, 15ª, to the receiving channel, 16ª, of the casing, is carried by the screw conveyer, 20, to the open forward end of the annular nozzle, 18ª, from which it is conveyed by the blast from the high pressure air blast pipe, 18, leading into said nozzle, to the discharge channel, 16ᵇ, and delivered therefrom to the preliminary combustion chamber, 9. Any excess amount of fuel that may be delivered by the screw conveyer, 20, will be carried back to the rear portion thereof by the return screw conveyer, 22, and again carried forward with a succeeding charge of fuel, clogging of the discharge channel, 16ᵇ, being thus prevented.

For the purpose of increasing or diminishing the force of the exhaust blast, in accordance with varying conditions of service, the exhaust pipe, 24, is provided with a variable or adjustable nozzle, 24ª, by which its discharge area may be diminished or increased as desired, said nozzle being of any suitable and preferred known construction, and being actuated by a hand lever, 25, in the cab of the locomotive, through a forwardly extending rod, 26. It may, from time to time, be necessary to temporarily materially increase the force of the blast, in order to clear out deposits of ash from the tubes, and to prevent damage from an unduly sudden increase of back pressure in the cylinders, by the reduction of the discharge area of the nozzle, a spring resistance regulating device, which is shown in Fig. 8, is interposed between the nozzle and the operating hand lever, 25. In the instance shown, the rod, 26, which connects the hand lever and the exhaust nozzle is divided into a forward and a rear section, the rear section having, secured upon its forward end, a cylindrical head, 27, adapted to abut against a corresponding head, 28, secured upon the rear end of the forward section. A cylindrical casing, 29, is secured to the head, 28, and a helical spring, 30, is fitted around the rear section of the rod, 26 within said casing and bears, at its ends, on the head 27, and on an abutment in the casing at the end thereof farther from said head. In the forward movements of the hand lever, 25, and rod, 26, by which the nozzle is opened to reduce draft, the pressure of the rear section of the rod on the forward section is effected directly by the bearing of the head, 27, on the head, 28. In the rearward movements of the hand lever and rod, by which the nozzle opening is reduced, to increase draft, the head, 27, bears on the spring, 30, and transmits the movement of the hand lever to the exhaust nozzle, through said spring, the casing, 29, the head, 28, and the forward section of the rod, 26. The spring resistance thereby interposed prevents unduly sudden increase of back pressure when it is desired to increase the draft.

The motors of the several blowers, conveyers, and fuel and air feeding mechanisms are, in the instance exemplified, indicated as being of the electric type, but may, if preferred, be operated by fluid pressure. When electric motors are applied they are actuated through suitable conductors (not shown) in the usual manner, by a fluid pressure operated generator, 31, which may be conveniently located on the front bumper platform of the locomotive. It will be obvious to those familiar with the operation of locomotives, that higher or lower steam pressures, as the case may be, are required under different conditions of service, in which there are frequent and considerable variations induced by differences of grade, load, and required speed, and also clear that the rate of fuel and air supply to the firebox by the mechanism hereinbefore described, should, for effective and economical operation, be properly proportioned to, and be varied in accordance with variations in, the steam pressure in the boiler. To this end, I provide both an automatically operable and a manually operable mechanism, whereby the actuating power of the several motors, whether the same be electricity or fluid pressure, may be controlled and varied correspondingly with, and proportionately to, variations of steam pressure, the construction and manner of operation of which controlling mechanisms, will now be described.

An operating cylinder, 32, is secured to a support, 33, which is located in any position in the cab of the locomotive that may be convenient for access by the fireman. The cylinder, 32, is closed at its ends by detachable heads, 32ª, 32ᵇ, and is fitted with a piston, 34, which is secured upon a rod, 35, passing through a properly packed stuffing box, 32ᶜ, in one of the heads, 32ª. The travel of the piston is comparatively short, and it occupies the major portion of the length of the cylinder. A helical spring, 36, is fitted around the piston rod in a cylindrical bore in the piston, said spring bearing at one end on the piston, and at the other end on the head, 32ª. A steam supply pipe, 32ᵈ, leads from a dome or turret on the boiler into the cylinder, on the side of the piston opposite that on which the spring, 36, bears, and a waste or discharge pipe, 32ᵉ, leads from the opposite end of the cylinder to the atmosphere. The piston rod, 35, is coupled by a link, 35$^a$, to one of the arms of a double armed switch lever, 37, which is journaled centrally on a pin, 37$^a$, fixed in the support, 33.

The arms of the lever, 37, carry suitable contact bars, operating over the sets of contact points of the resistances, R$^1$, R$^2$, R$^3$ and R$^4$, for controlling the respective motors, 19$^a$, 17$^b$, 15$^b$ and 21, as indicated in the diagram, Fig. 13. As the boiler steam pressure acting on the piston, 34, rises to a degree sufficient to overcome the spring, 36, the piston is forced gradually upward, compressing said spring and turning the double armed switch lever, 37, about its pivot, thereby varying the several resistances to reduce the speed of the respective motors and diminish the supply of fuel to the furnace. When the steam pressure begins to fall, the spring moves the piston downwardly, and turns the lever arm in the opposite direction to cut in the resistance and effect an increase in the speed of operation of the several motors. In this manner, the fire may be automatically regulated to maintain the steam pressure substantially constant. While any other suitable type of motor may be employed, I prefer to use motors of the shunt wound type, as indicated in Fig. 13, in which the resistance is inserted in the field circuit, and is adapted to be cut out to reduce the speed, and cut in when it is desired to increase the speed. The coils for the resistances R$^1$, R$^2$, R$^3$ and R$^4$ are preferably located in a resistance box R, in such a manner that the respective coils are separately removable at all times, whereby the resistance coils for any motor or set of motors may be readily removed and replaced by others when desired to change the amount of resistance or vary the relation between the speeds of the different motors or sets of motors, such as to give the desired results.

It may be desirable at times to control the motors manually, as for instance, when ascending a grade the engineer may wish to reduce the fire shortly before reaching the summit, and for this purpose, I provide a switch lever, 40, mounted on a pivot, 40$^a$, and having, at one end, a contact bar, 40$^b$, adapted to engage stationary contacts, $r^1$, $r^2$, $r^3$, $r^4$ and $l^2$, when pushed down by means of a handle or push button, 40$^c$, (see Figs. 9 and 10). This operates to short circuit the several resistances and connect the field of each motor directly to the ground or negative return line, L$^2$, to the generator, (see Fig. 13), and consequently reduces the speed of all the motors to the minimum. The lever, 40, is normally held against the stop, 42, in the position indicated in dotted lines in Fig. 10, by means of a spring, 43. In order to hold the lever, 40, in the position indicated in full lines in Fig. 10, when operated manually to close the connections at 40$^b$, there is provided a small trigger or trip lever, 39, pivoted at 39$^c$, and having a non-positive stop engagement with the head of the lever, 40. Such a connection may comprise a pin, 40$^d$, on the lever, 40, engaging a rounded recess in the trip lever, and a yielding spring, 41, for holding the trip lever pressed against said pin. The trip lever, 39, also carries a roller, 39$^a$, in position to be engaged by a cam plate, 38, adjustably mounted on the end of the lever arm, 37.

When the switch arm, 40, is thrown down by hand, to cut out the resistances and reduce the speed of the fuel feeding motors, the steam pressure is correspondingly diminished, and the arm, 37, is turned by the spring, 36, to the maximum speed position. When the pressure increases, as will happen, for instance, just as the train reaches the top of a hill and begins a descent or continues on a level stretch of road, even should the engineer have depressed the lever 40, as is sometimes done immediately before reaching the top of a grade, thereby short circuiting the resistances in the fields of the fuel feeding motors and cutting down their speed to the minimum, the cam plate, 38, engages the roller, 39$^a$, of the trip lever, 39, and turns the same upon its pivot. This releases the pin of the lever, 40, and permits the spring, 43, to return the lever, 40, to its normal position, with the bar, 40$^b$, disconnected from the contact points, and the mechanism is thus automatically restored to the condition of being subject to the control of the steam pressure in the regulating cylinder, 32. If, after having cut out the resistance by the manual control lever, 40, the engineer should desire to manually restore the mechanism to its automatic control condition, he may simply turn the trip lever, 39, by means of the handle 39$^b$, thereby releasing the locking pin, 40$^d$, and allowing the lever, 40, to be thrown out by the spring, 43, as before described. It will thus be seen that the mechanism is normally subject to the automatic control, in which the speed of the feeding motors is governed by the steam pressure, but that under certain conditions, as when ascending grades, the engineer may control the same manually.

Various modifications may be made in the structural details of the application of my invention which is herein set forth, without effect upon the operation and results thereof, or departure from its characteristic features and operative principle. I do not therefore limit it to the specific construction in which it has been herein exemplified, but include such variations in the structure, relative location, and individual features of its several elements, as may, in the coöperation thereof substantially in the manner hereinbefore described, attain the results for which my invention is desired, by a similar manner of operation.

I claim as my invention and desire to secure by Letters Patent:

A pulverized fuel burning apparatus comprising in combination a means of relatively small capacity for introducing a mixture of pulverized fuel and air, a preliminary expansion chamber into which the mixture of fuel and air is introduced and which is provided with means for admitting additional air at the place where the fuel is admitted and in which the fuel is preliminarily mixed and treated, said preliminary chamber being also provided with an outlet, a relatively large combustion chamber into which said outlet opens, said combustion chamber having means for admitting additional air therein, comprising a passage located above said preliminary chamber and projecting forwardly thereof into the combustion chamber, said combustion chamber also having a waste outlet and means communicating with the upper part of the chamber for inducing a draft therein.

JOHN E. MUHLFELD.

Witnesses:
EMILY L. MYERS,
E. E. FLODINE.